US 6,732,506 B2

(12) United States Patent
Patterson et al.

(10) Patent No.: US 6,732,506 B2
(45) Date of Patent: May 11, 2004

(54) CYLINDER DEACTIVATION SYSTEM AND NOX TRAP REGENERATION

(75) Inventors: Gary J. Patterson, Utica, MI (US); Alan William Hayman, Romeo, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/116,457

(22) Filed: Apr. 3, 2002

(65) Prior Publication Data

US 2003/0188527 A1 Oct. 9, 2003

(51) Int. Cl.$^7$ ................................................. F01N 3/00
(52) U.S. Cl. .............................. 60/285; 60/274; 60/295; 123/198 F
(58) Field of Search ........................... 60/274, 284, 285, 60/286, 295, 301, 276; 123/198 F, 481, 691, 692

(56) References Cited

U.S. PATENT DOCUMENTS

| 4,134,261 A | * | 1/1979 | Iizuka et al. | 60/285 |
| 4,245,471 A | * | 1/1981 | Sugasawa et al. | 60/301 |
| 4,467,602 A | * | 8/1984 | Iizuka et al. | 60/285 |
| 5,448,887 A | * | 9/1995 | Takeshima | 60/285 |
| 5,473,887 A | | 12/1995 | Takeshima et al. | 60/276 |
| 5,653,102 A | * | 8/1997 | Orzel et al. | 60/274 |
| 5,740,669 A | * | 4/1998 | Kinugasa et al. | 60/285 |
| 5,867,982 A | * | 2/1999 | Tengblad et al. | 60/285 |
| 5,884,476 A | | 3/1999 | Hirota et al. | 60/278 |
| 6,023,929 A | * | 2/2000 | Ma | 60/285 |
| 6,164,065 A | * | 12/2000 | Denari et al. | 60/284 |
| 6,389,806 B1 | * | 5/2002 | Glugla et al. | 60/274 |

FOREIGN PATENT DOCUMENTS

JP 58-140432 * 8/1983

* cited by examiner

*Primary Examiner*—Thomas Denion
*Assistant Examiner*—Tu M. Nguyen
(74) *Attorney, Agent, or Firm*—Christopher DeVries

(57) ABSTRACT

An engine control system in a vehicle including a variable displacement internal combustion engine, a controller for controlling the displacement of the variable displacement internal combustion engine, an exhaust manifold coupled to the variable displacement internal combustion engine, a NOx trap coupled to the exhaust manifold, and where the controller varies the displacement of the variable displacement internal combustion engine to optimize the regeneration of the NOx trap.

7 Claims, 4 Drawing Sheets

CYLINDER DEACTIVATION SYSTEM AND NOX TRAP REGENERATION

TECHNICAL FIELD

The present invention relates to the control of internal combustion engines. More specifically, the present invention relates to a method and apparatus to control exhaust emissions in a variable displacement internal combustion engine.

BACKGROUND OF THE INVENTION

Present regulatory conditions in the automotive market have led to an increasing demand to improve fuel economy and reduce emissions in present vehicles. These regulatory conditions must be balanced with the demands of a consumer for high performance and quick response for a vehicle.

Variable displacement internal combustion engines (ICEs) provide for improved fuel economy and torque on demand by operating on the principal of cylinder deactivation. During operating conditions that require a relatively high output torque, every cylinder of a variable displacement ICE is supplied with fuel, air and spark to provide torque for the ICE. During operating conditions at low speed, low load and/or other inefficient conditions for a fully displaced ICE, cylinders may be deactivated to improve fuel economy for the variable displacement ICE and vehicle. For example, in the operation of a vehicle equipped with an eight-cylinder variable displacement ICE, fuel economy will be improved if the ICE is operated with only four cylinders during relatively low torque operating conditions by reducing throttling losses.

Throttling losses, also known as pumping losses, are the extra work that an ICE must perform to pump air from the relatively low pressure of an intake manifold through the ICE and out to the atmosphere. The cylinders that are deactivated will not allow air flow through their intake and exhaust valves, reducing pumping losses by forcing the ICE to operate at a higher intake manifold pressure. Since the deactivated cylinders do not allow air to flow, additional losses are avoided by operating the deactivated cylinders as "air springs" due to the compression and decompression of the air in each deactivated cylinder.

During the operation of the ICE, if the ICE is in a condition where it is inefficient to operate with the full complement of cylinders, a controller will deactivate the mechanisms operating the valves for selected cylinders and also shut off fuel to the cylinders. During a high torque demand condition for the ICE, the cylinders will be reactivated by operating the valves and supplying fuel to the cylinders.

Air-fuel ratios may also be adjusted to improve fuel economy in a vehicle. An air-fuel mixture is represented by a ratio called the equivalence ratio which is represented by the symbol $\lambda$. The equivalence ratio is defined by the following equation:

$$\lambda = \frac{(air/fuel)}{(air/fuel\ stoichiometry)}$$

A relatively low air/fuel ratio below 14.7 ($\lambda<1$) is characterized as a rich mixture, and an air fuel ratio above 14.7 ($\lambda>1$) can be characterized as a lean mixture. Traditional vehicle engines are operated at stoichiometry since most regulated gases are reduced at stoichiometry. If vehicle engines are operated as a lean mixture, such as found in direct injection engines having lean stratified operations, fuel economy may be improved, but the production of NOx compounds is increased due to the increase in oxygen in the air-fuel mixture. The additional NOx compounds generated by a lean burning engine may not be sufficiently reduced by a traditional three-way catalyst to meet present regulations.

SUMMARY OF THE INVENTION

The present invention is a method and apparatus for the control of NOx emissions in a variable displacement engine. In the preferred embodiment of the present invention, an eight-cylinder internal overhead valve (OHV) internal combustion engine (ICE) may be operated as a four-cylinder engine by deactivating four cylinders, but any overhead cam (OHC) ICE equipped with cylinder deactivation is within the scope of the present invention. The cylinders in the preferred embodiment are deactivated by an electro-hydraulic deactivation system using engine oil pressure, controlled by solenoids, to pressurize the locking pins of special engine valve lifters (as used in an OHV engine). With pressure applied, the locking pins allow the lifter to act as a lost motion device to prevent exhaust and intake valve activation.

Under lean operating conditions such as found in direct injection engines, or engines operating under lean stratified conditions, a NOx trap is used to capture NOx emission from the exhaust gas flow. Periodically (once the NOx trap is saturated or at some predetermined threshold), the air-fuel mixture is adjusted to a rich mixture to regenerate the NOx trap and chemically reduce the NOx trapped in the NOx trap. Hydrocarbons and carbon monoxide generated by the rich air-fuel mixture will react with the released NOx to reduce the NOx into nitrogen $N_2$ and oxygen $O_2$. The frequency of NOx trap regeneration is calibrated as a function of the capacity of the NOx trap. A drawback to this technique is that some or all of the fuel economy gained through lean operation is lost in the regeneration mode. Careful timing of the enrichment of the air-fuel mixture can help minimize fuel losses but they are still relatively significant.

The deactivation of cylinders in the present invention significantly reduces fuel consumption under lean and rich operating conditions. By switching from lean operation, when the engine is in a fully displaced mode, to a partially displaced mode, the ICE can operate efficiently at homogeneous or rich fuel-air ratios and still provide improved fuel economy over a homogeneous fully displaced ICE operation. The overall effect is that fuel economy improvements generated by lean operation in a fully displaced operating mode will not be canceled out by rich operation in a partially displaced mode when the NOx trap is regenerated. Accordingly, variable displacement engines may be run in a partially displaced mode with an air-fuel ratio richer than stoichiometric to regenerate the NOx trap without the fuel economy penalties generated by running a rich air-fuel mixture during fully displaced operation.

DESCRIPTION OF THE PREFERRED EMBODIMENT

Figure 1:
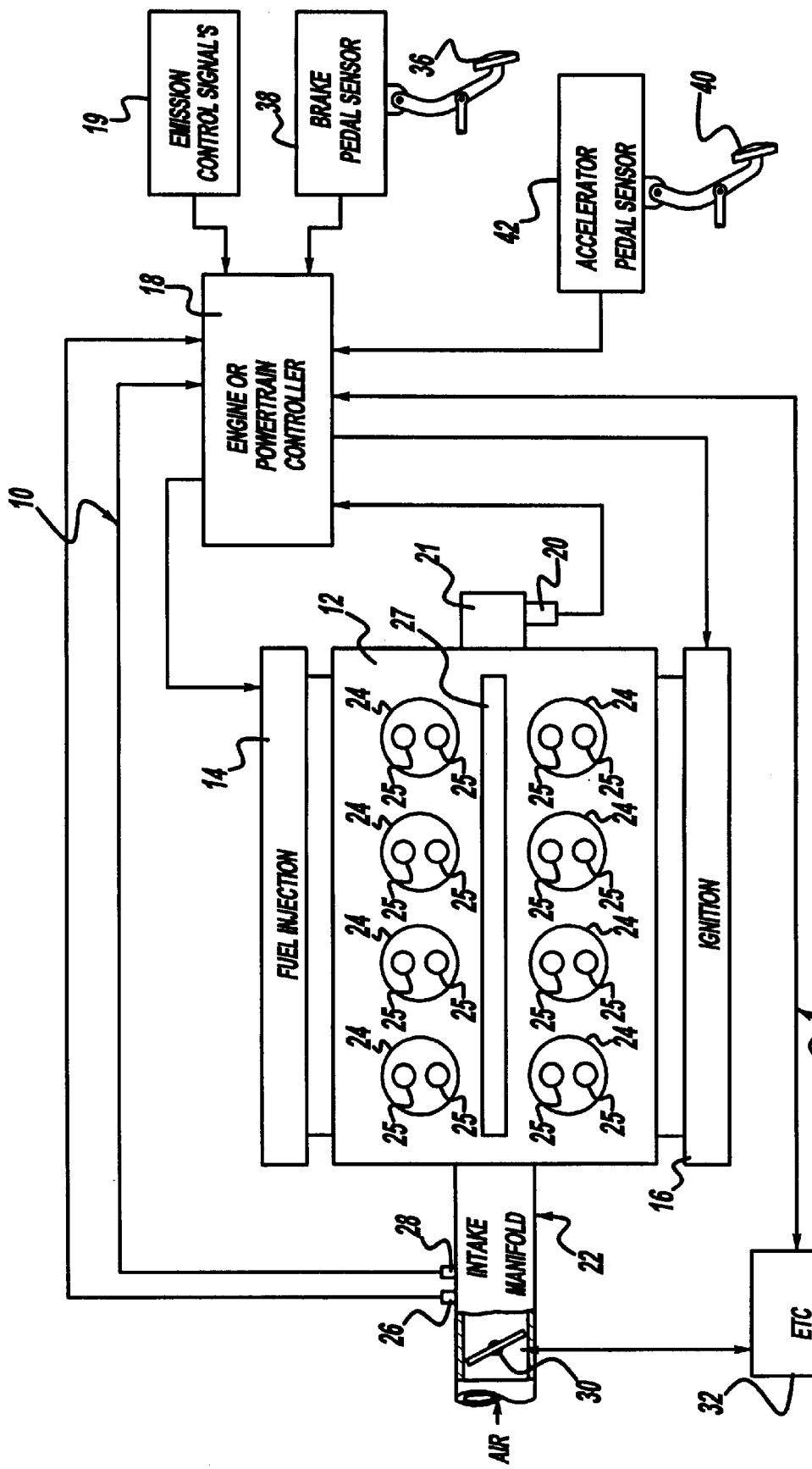
FIG. 1 is a diagrammatic drawing of the control system of the present invention.

FIG. 1 is a diagrammatic drawing of the vehicle control system 10 of the present invention. The control system 10 include a variable displacement ICE 12 having fuel injectors 14 and spark plugs 16 (in the case of a gasoline engine) controlled by an engine or powertrain controller 18. The ICE 12 crankshaft 21 speed and position are detected by a speed and position detector 20 that generates a signal such as a pulse train to the engine controller 18. The ICE 12 preferably is a V-8 engine with an OHV configuration, but any multi-cylinder engine is considered with in the scope of the present invention, including OHC engines equipped with direct injection, multi-port injection and/or engines with lean stratified operation command. An intake manifold 22 provides air to the cylinders 24 of the ICE 10, the cylinders having valves 25. The valves 25 are further coupled to an actuation apparatus such as used in an OHV or OHC engine configuration that may be physically coupled and decoupled to the valves 25 to shut off air flow through the cylinders 24. An air flow sensor 26 and manifold air pressure (MAP) sensor 28 detect the air flow and air pressure within the intake manifold 22 and generate signals to the powertrain controller 18. The airflow sensor 26 is preferably a hot wire anemometer, and the MAP sensor 28 is preferably a strain gauge. Emission control signals 19 provide the powertrain controller with data on the emissions including oxygen levels in the exhaust.

An electronic throttle 30 having a throttle plate controlled by an electronic throttle controller 32 controls the amount of air entering the intake manifold 22. The electronic throttle 30 may utilize any known electric motor or actuation technology in the art including, but not limited to, DC motors, AC motors, permanent magnet brushless motors, and reluctance motors. The electronic throttle controller 32 includes power circuitry to modulate the electronic throttle 30 and circuitry to receive position and speed input from the electronic throttle 30. In the preferred embodiment of the present invention, an absolute rotary encoder is coupled to the electronic throttle 30 to provide speed and position information to the electronic throttle controller 32. In alternate embodiments of the present invention, a potentiometer may be used to provide speed and position information for the electronic throttle 30. The electronic throttle controller 32 further includes communication circuitry such as a serial link or automotive communication network interface to communicate with the powertrain controller 18 over an automotive communications network 33. In alternate embodiments of the present invention, the electronic throttle controller 32 may be fully integrated into the powertrain controller 18 to eliminate the need for a physically separate electronic throttle controller.

A brake pedal 36 in the vehicle is equipped with a brake pedal sensor 38 to determine the amount of pressure generated by an operator of the vehicle on the brake pedal 36. The brake pedal sensor 36 generates a signal to the powertrain controller 18 to determine a braking condition for the vehicle. A braking condition will indicate a relatively low torque/low demand condition for the variable displacement ICE 12. An accelerator pedal 40 in the vehicle is equipped with a pedal position sensor 42 to sense the position of the accelerator pedal. The pedal position sensor 42 signal is also communicated to the powertrain controller 18 to signal a change in desired torque. In the preferred embodiment of the present invention, the brake pedal sensor 38 is a strain gauge and the pedal position sensor 42 is an absolute rotary encoder.

Figure 2:
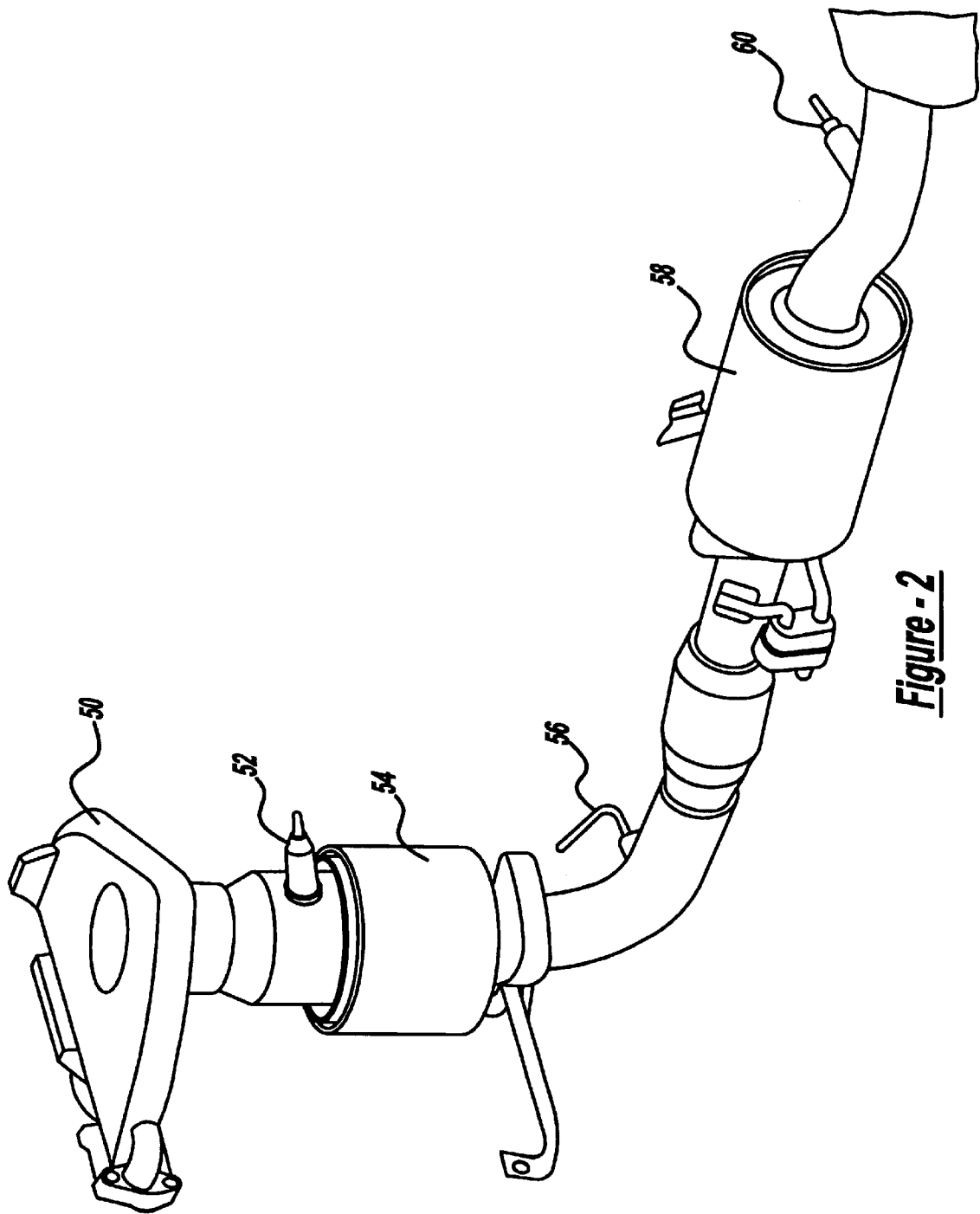
FIG. 2 is a diagrammatic drawing of the emission control system of the present invention.

FIG. 2 is a diagrammatic drawing of the exhaust and emission controls of the present invention. Exhaust manifold 50 channels the exhaust from the ICE 12 to a wide band oxygen sensor 52 used to provide feedback for the air-fuel ratio. A three-way catalyst 54, as is known in the art, controls carbon monoxide, NOx, and hydrocarbon elements in the exhaust emission. A temperature sensor 56 is used to determine the operating characteristics of the three-way catalyst. A NOx trap 58 traps the NOx not reduced by the three-way catalyst 54 and a second oxygen sensor 60 provides additional feedback for control of the air-fuel ratio.

Figure 3:
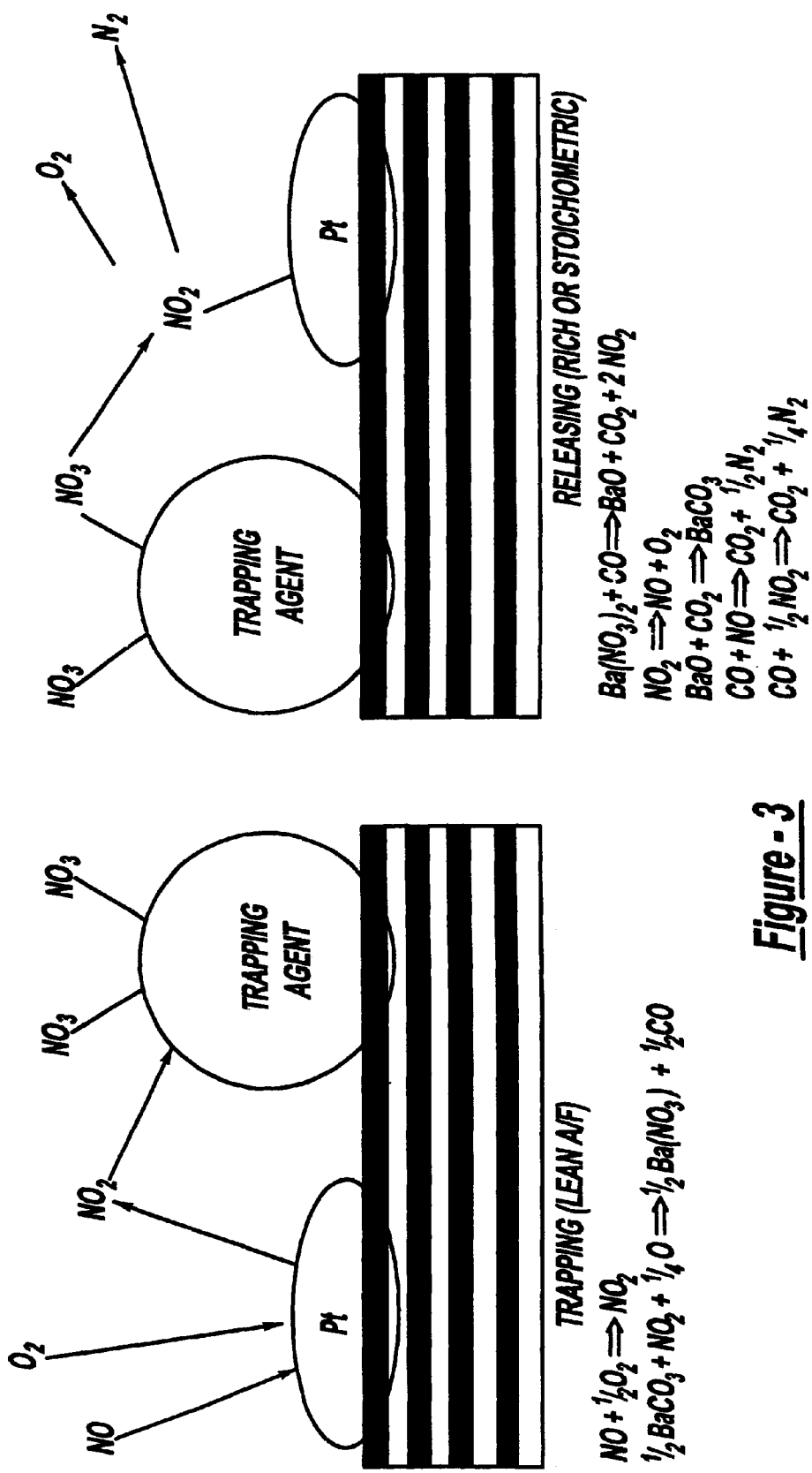
FIG. 3 is a process drawing of the NOx adsorber chemistry in the present invention.

Referring to FIG. 3, the NOx trap 58 utilizes barium as a trapping agent for NOx compounds during lean operating conditions and releases NOx compounds during rich conditions. The hydrocarbons in the relatively rich exhaust stream combine with the NOx and are converted to nitrogen and oxygen as seen in FIG. 3.

Figure 4:
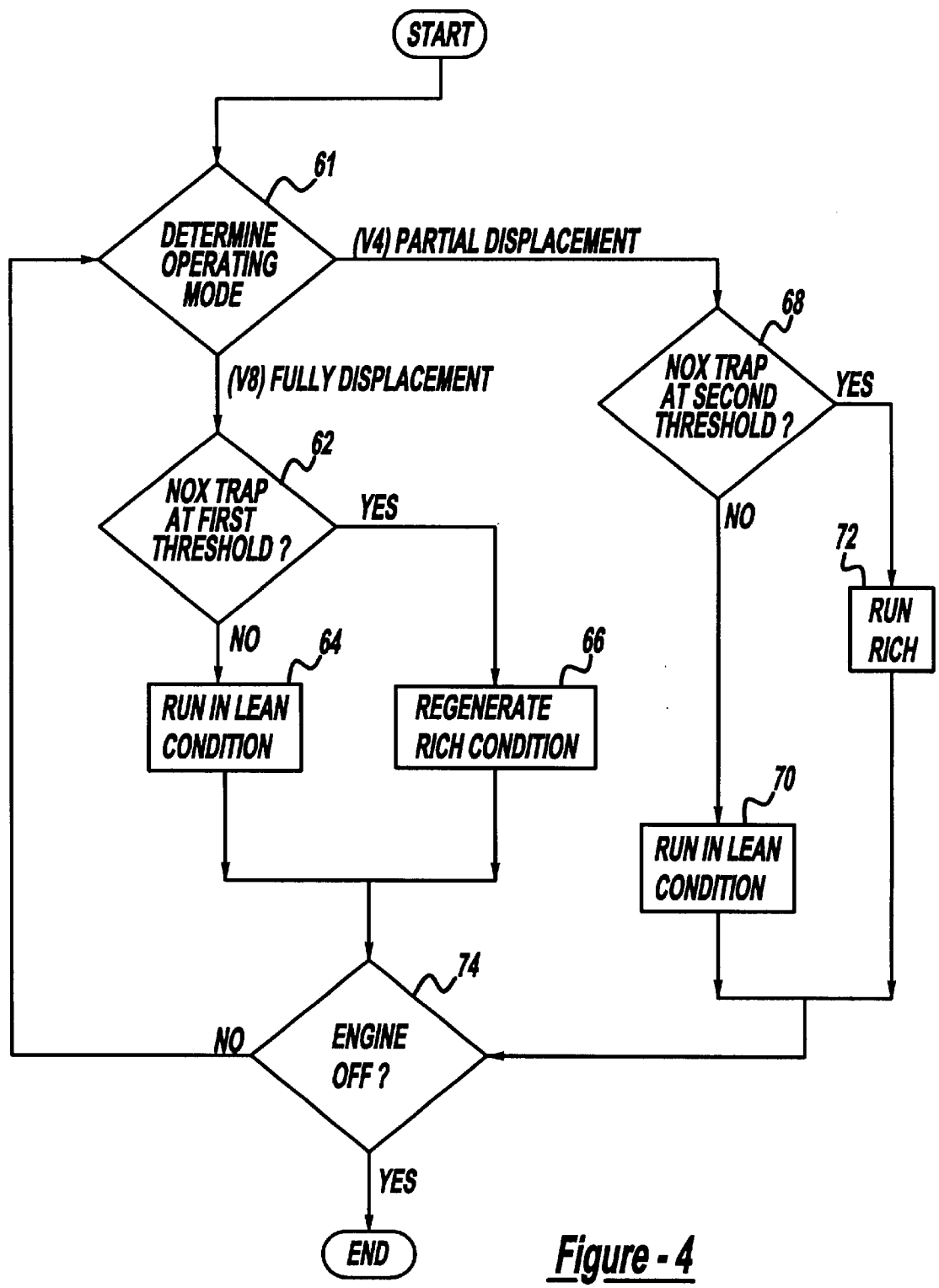
FIG. 4 is a flow chart of a preferred method of the present invention.

FIG. 4 is a flowchart of the operation of the present invention. Starting at block 61, the routine determines if the desired torque request and torque headroom allows the variable displacement ICE 12 to operate in a partially displaced operating mode for fuel economy gains. If the desired torque requires a fully displaced operating mode, then at block 62 the routine determines if the NOx trap 58 has reached a first threshold in NOx saturation. If the NOx saturation is below this threshold, the ICE 12 will run in lean operation at block 64. If the NOx saturation is above this threshold, the ICE 12 will run in rich operation at block 66 to regenerate the NOx trap 58. If the ICE 12 is operating in a partially displaced mode, the routine will continue to block 68 to determine if the NOx trap 58 has reached a second threshold in NOx saturation. This second threshold will always be less than the first threshold since it is desirable to regenerate in a partially displaced operating mode rather than a fully displaced operating mode. If the NOx trap 58 is below this second threshold, the ICE 12 will run in lean operation at block 70, and if the NOx trap is above this second threshold, the ICE 12 will run in rich operation at block 72. The first and second thresholds are optimized to ensure that the ICE 12 is primarily regenerating in a partially displaced configuration. The routine at block 74 will determine if the ICE 12 has been shut off by the operator.

While this invention has been described in terms of some specific embodiments, it will be appreciated that other forms can readily be adapted by one skilled in the art. Accordingly, the scope of this invention is to be considered limited only by the following claims.

What is claimed is:

1. An engine control system in a vehicle comprising:

variable displacement internal combustion engine;

a controller for controlling the displacement of said variable displacement internal combustion engine;

an exhaust manifold coupled to said variable displacement internal combustion engine; and a NOx trap fluidly coupled to said exhaust manifold;

wherein air flow is substantially prevented to deactivated cylinders in said variable displacement internal combustion engine while operating in a partially displaced operating mode; and wherein said NOx trap is regenerated by adding a rich fuel mixture to the variable displacement internal combustion in a partially displaced operating mode.

2. The engine control system of claim 1 wherein said variable displacement internal combustion engine is an eight-cylinder engine.

3. The engine control system of claim 1 wherein said variable displacement internal combustion engine is a direct injection engine.

4. The engine control system of claim 1 wherein said variable displacement internal combustion engine Is configured as an overhead camshaft engine.

5. The engine control system of claim 1 wherein said NOx trap is a NOx absorbent.

6. The engine control system of claim 1 wherein said NOx trap is a NOx absorber.

7. A method of regenerating an exhaust purification device in a variable displacement internal combustion engine comprising:

operating the variable displacement internal combustion engine in a partially displaced configuration;

substantially preventing air flow to deactivated cylinders while the variable displacement internal combustion engine operates in a partially displaced configuration;

regenerating the exhaust purification device; and wherein the exhaust purification device is a NOx trap and the step of regenerating the exhaust purification device comprises the step of adding a rich fuel mixture to the variable displacement internal combustion engine.

* * * * *